United States Patent [19]

Scales

[11] 4,102,838

[45] Jul. 25, 1978

[54] COMPOSITION AND METHOD FOR SELECTIVE BORONIZING

[75] Inventor: Stanley R. Scales, Houston, Tex.

[73] Assignee: Hughes Tool Company, Houston, Tex.

[21] Appl. No.: 799,799

[22] Filed: May 23, 1977

[51] Int. Cl.² ............... C09D 3/64; C23C 11/10; C21D 1/48
[52] U.S. Cl. ............ 260/22 CB; 106/308 F; 148/6.35; 148/16.5; 260/37 R; 260/40 R
[58] Field of Search ............ 428/209; 260/22 CB, 260/42.25, 42.56, 37 R, 40 R; 106/308 F; 148/16.5, 6.35

[56] References Cited

U.S. PATENT DOCUMENTS

| | | | |
|---|---|---|---|
| 2,613,158 | 10/1952 | Walton et al. | 260/42.56 |
| 2,857,347 | 10/1958 | deGroot et al. | 260/22 CB |
| 3,094,428 | 6/1963 | Hamilton et al. | 106/296 |
| 3,121,017 | 2/1964 | Berstein et al. | 260/40 R |
| 3,123,487 | 3/1964 | Verdier | 260/40 R |
| 3,151,002 | 9/1964 | Benz et al. | 148/6.35 |
| 3,488,204 | 1/1970 | Jordan et al. | 106/296 |
| 3,658,737 | 4/1972 | Irwin | 260/42.25 |
| 3,806,374 | 4/1974 | Krzyminski | 148/6.35 |
| 3,915,906 | 10/1975 | Romey | 260/42.25 |

*Primary Examiner*—Ronald W. Griffin
*Attorney, Agent, or Firm*—Robert A. Felsman

[57] ABSTRACT

Disclosed herein is a method of selectively boronizing of the surface of ferrous metal that is characterized by applying to such area as is not to be boronized a coating consisting essentially of finely divided titanium dioxide, finely divided carbonaceous material and an anhydrous binding agent in effective amounts to form a boronizing resist having boronizing resistance during boronizing, then boronizing the ferrous metals at a temperature at which the coating forms the boronizing resist and subsequently removing the boronizing resist. Also disclosed are compositions for preferred applications of the coating and additional details on preferred embodiments.

17 Claims, No Drawings

COMPOSITION AND METHOD FOR SELECTIVE BORONIZING

DESCRIPTION OF THE PRIOR ART

1. Field of the Invention

This invention relates to method of and composition for protective coatings of the so-called "boronizing resist" type to be applied to surfaces of iron and steel parts prior to boronizing in order to protect predetermined surfaces against boronizing.

2. Description of the Prior Art

In general, the boronizing of ferrous metal surfaces and the like is known in the prior art. This boronizing is accomplished by a variety of methods; such as, packing the surface in the boronizing powder and boronizing for a relatively long period of time at a boronizing temperature; gas boronizing; and liquid boronizing. These methods are set out in earlier U.S. Pat. No. 3,922,038, issued Nov. 25, 1975 to Stanley R. Scales; and the descriptive matter of that patent is embodied by reference herein for details that are omitted herefrom. Also, a wide variety of paints are known in the prior art, including paint such as described in U.S. Pat. No. 3,151,002 for selective carburization. These paints are not, however, satisfactory for successfully excluding selective surface areas from the boronizing when carried at an elevated temperature for the protracted interval of time. Attempts were made to find a commercially available paint that could be employed in the selective boronizing, but no such paint was found. A wide variety of compositions were tried before the composition of this invention was found to be satisfactory.

Lamp black and titanium dioxide have been employed in a variety of other paint compositions; but the paint compositions themselves were not satisfactory for the selective boronizing in accordance with this invention. Illustrative of these are the following list of United States patents and their abstracts:

U.S. Pat. No. 3,094,428 teaches titanium oxide and carbon black composition for tires. U.S. Pat. No. 3,121,017 relates to a blue-toned composition that can employ titanium dioxide and carbon black.

U.S. Pat. No. 2,568,424 shows a corrosion resistant coating comprising lamp black and titanium oxide.

U.S. Pat. No. 2,009,436 relates to a non caking pigment that includes a composition of stearin pitch and titanium dioxide pigment.

U.S. Pat. No. 3,453,131 discloses a paint composition that includes carbon black and titanium dioxide; as is U.S. Pat. Nos. 3,488,204 and 3,799,788.

U.S. Pat. No. 3,923,697 provides a composition for metals including graphite and metal oxides of manganese and zinc.

U.S. Pat. No. 2,846,344 shows a composition for carburizing that includes titanium dioxide as a regenerator.

U.S. Pat. No. 2,580,524 relates to coating for molds and ingots and mentions graphitic anthracite containing titanium dioxide.

U.S. Pat. No. 3,384,581 shows a lubricant composition having pigments of titanium dioxide and carbon black; as does U.S. Pat. No. 3,654,171.

U.S. Pat. No. 3,655,172 discloses the use of graphite to reduce carburizing.

U.S. Pat. No. 2,188,063 shows case hardening composition including graphite to form a protective layer.

U.S. Pat. No. 3,406,228 employs carbon black in an oxide mixture for forming carbon articles.

From the foregoing it can be seen that although the general art of paints is crowded, the prior art has not provided a composition or method that can be employed for selectively boronizing articles, such as ferrous surfaces.

SUMMARY OF THE INVENTION

Accordingly, it is an object of this invention to provide method and apparatus for selectively boronizing surfaces of articles, such as ferrous surfaces of drill bit components and the like.

It is another object of this invention to provide a method and composition in which a paint can be readily and easily applied to a specific surface not to be borohized while the boronizing is carried out to boronize the remainder of the exposed surface; yet, provide a boronizing resist that can be readily washed from the protected surface; while obviating the disadvantages of the prior art.

These and other objects will become apparent from the descriptive matter hereinafter.

In accordance with one embodiment of this invention, there is provided a method of selectively boronizing the surface of ferrous metal that comprises applying to such area as is not to be boronized a coating consisting essentially of finely divided titanium dioxide, finely divided carbonaceous material like graphite and an anhydrous binding agent in effective amounts to form a boronizing resist having a boronizing resistance during boronizing, then boronizing the ferrous metal at a temperature at which the coating forms the boronizing resist and subsequently removing the boronizing resist.

In accordance with another embodiment of this invention, there is provided a composition, or paint, for painting a surface that is not to be boronized during boronizing. The paint comprises effective concentrations within the respective ranges of 10–50 percent by weight of finely divided titanium dioxide; 20–70 percent by weight of finely divided carbonaceous material, like graphite; and 20–30 percent of an anhydrous binding agent that will provide sufficient fluidity to obtain a predetermined viscosity and that will burn away at temperatures in excess of 1400° F to leave a boronizing resist on the surfaces that are to be protected against boronizing at boronizing temperatures.

DESCRIPTION OF THE PREFERRED EMBODIMENTS

The use of this invention enables selectively boronizing of ferrous metal surfaces regardless of whether there is employed the single step or multiple step boronizing, as described in U.S. Pat. No. 3,922,038. Before the details of the method are described, the respective ingredients will be described. As indicated hereinbefore, the paint comprises titanium dioxide, carbonaceous material, such as graphite; and an anhydrous binding agent.

The titanium dioxide is finely divided in powder form to facilitate blending into a smooth paint of uniform consistency. It is readily commercially available; for example, from Van Waters and Rogers, 6733 Silsbee, Houston, TEX, as New Jersey Zinc #R-745. The titanium dioxide is described in issued patents, in standard reference texts such as chemical dictionaries and is employed in the pigment grade powder form. Specifically, the titanium dioxide particles are all small enough to pass through a 100 mesh screen and 90 percent will pass through a 325 mesh standard screen.

The finely divided carbonaceous material may comprise any of the conventionally available forms of carbon, including, but not limited to graphite, other coal, carbon black and the like. The preferred form that has been employed to date has been flaked graphite, pigment grade. The pigment grade flaked graphite is well recognized and is commercially available as Asbury #485, available from Thompson Hayward, 1701 Oliver, Houston, TEX. It passes at least 95 percent through a 100 mesh standard screen. If other than flaked graphite is employed, the particle sizes of the carbonaceous material are −100 mesh with at least 85 percent passing through a 325 mesh, similarly as described hereinbefore with respect to the finely divided titanium dioxide powder.

The anhydrous binding agent may comprise any of the materials that will provide sufficient fluidity to allow obtaining a predetermined viscosity of the entire admixture of the titanium dioxide, carbonaceous material and anhydrous binding agent; and will burn away at temperatures in excess of 1400° F; such as a boronizing temperature of about 1650° F; to leave a boronizing resist on the surfaces that are to be protected against boronizing. The anhydrous binding agent may comprise conventional synthetic resin lacquers such as a resin dissolved in a solvent, or carrier. These lacquers are commercially available, as are the resins and the solvents.

The resins may comprise the usual resin for imparting the viscosity to hold in suspension the particulate materials such as the titanium dioxide and graphite. The resins range from the pentaerythritol esters of rosin to the vinyl-toluene modified alkyd resin, the latter being particularly preferred. The preferred resin is thus vinyl toluene phtalic anhydride resin. The preferred resin is in the form of flakes, small particles or liquid. The size of the flakes or particles of resin or its viscosity is not critical to performance, however, since the resin is dissolved in the solvent. Larger flakes or particles take longer to dissolve. The resin is readily commercially available; for example, the preferred liquid resin is available as Styresol 13-038, from Reichhold Chemicals, Newport Sales Division, 2800 North Loop West, Houston, Tex.

The solvent may comprise the usual organic solvent, such as the paraffinic and aromatic hydrocarbons. For example, the solvent may comprise a painter's grade naphtha consisting essentially of petroleum spirits with a boiling point range of from 200° to about 400° F; or the aromatic compounds, such as benzene, xylene, or toluene. The xylene, or dimethyl benzene, is particularly preferred. The solvents, such as naphtha or xylene, are also readily commercially available.

In some embodiments of this invention, other ingredients may be desired in the boronizing resist for special purpose. These other ingredients may comprise metallic oxides such as tin oxide alone or in combination with copper oxide. The other solid metallic oxides are finely divided powders such that 100 percent will pass through a 100 mesh screen and 85 percent will pass through a 325 mesh screen. Such metallic oxide powders are commercially available and need not be described in great detail herein.

The finely divided titanium dioxide is employed in a concentration in the range of 10–50 percent by weight of the total composition, preferably in the range of 25–45percent by weight. An excellent result has been obtained when titanium dioxide is present in the amount of about 35.4 percent by weight. This is equivalent to about 45 percent by weight of the portion made up by the resin, titanium dioxide and the graphite, or carbonaceous material, excluding the solvent.

The carbonaceous material is employed in a concentration within the range of 20–70 percent by weight of the total composition. The graphite, similarly as with the titanium dioxide, is preferably present in the range of 25–45 percent by weight. In a particularly preferred composition, the carbonaceous material is employed in the concentration of about 35.4 percent by weight of the total composition. This is equivalent to about 45 percent by weight of the portion comprising the titanium dioxide, graphite and resin, excluding the solvent.

The anhydrous binding agent should be present in a concentration within the range of 10–40 percent by weight. Preferably, the anhydrous binding agent is employed in the concentration within the range of 20–30 percent by weight. In the preferred composition, the anhydrous binding agent is employed with the concentration of about 29.2 percent by weight.

The anhydrous binding agent, as indicated hereinbefore may comprise the resin in the form of a solid or liquid in combination with a solvent. In this combination, the resin may comprise 5–20 percent by weight of the total composition. In the preferred composition, about 7.8 percent by weight of resin is employed. This is equivalent to about 10 percent by weight of the portion made up by the titanium dioxide, graphite and resin, to be added to the solvent. The solvent may comprise from 10–30 percent by weight. The amount that is employed will be determined by the predetermined viscosity that is desired. A viscosity that has been found satisfactory is that which gives a time interval on a commercially available paint viscosimeter, such as the Sears 16,393, of 18–31 seconds for the first 25 milliliters and 49–100 seconds for the first 50 milliliters. This combination of solvent having the predetermined viscosity will usually give a specific gravity in the range of 1.5–1.8. In a preferred embodiment, the solvent is employed in the concentration of about 21.4 percent by weight.

When the finely divided powdered oxides are employed, they are employed in a total combination less than 45 percent by weight of the solids plus resin. The additional or extra, metallic oxides, alone or in totality, shall not exceed the concentration of the greatest of either the titanium dioxide or the graphite in order not to dilute the boronizing resist, even though accomplishing other special purposes.

In operation, the resin is admixed with the solvent and while admixing, the titanium dioxide is added slowly. The graphite, or carbonaceous material, is also added very slowly during the mixture in order to obtain a uniform consistency. Mixing is continued until the consistency is very smooth with no lumps or dry material present in the total admixture.

A sample is delivered to the laboratory for testing and the paint apportioned in aliquot portions into respective cans while uniformly admixed.

The usual safety precautions should be observed to protect the operator, during the mixing, from the finely divided solids as well as inhalation of vapors of the solvent; particularly if an aromatic solvent such as xylene is employed.

The protective paint is thereafter applied to the area to be protected against boronizing. After the selected areas have been thus protected in accordance with the foregoing description, the ferrous metal element is subjected to the boronizing conditions at a boronizing temperature. For example, it may be boronized by the pack boronizing method. In this method the boronizing powder is packed around the surface, whether a ferrous surface alone or a ferrous surface that has been previously carburized in accordance with U.S. Pat. No. 3,922,038. The boronizing powder may be any of those conventional; for example, 90 percent finer than 150 mesh, have 40–80 percent by $B_4C$, 2–40 percent graphite, 1–4 percent $KHCO_3$, with the remainder up to 20 percent in impurities. The total pack, including the ferrous metal object with its surfaces are subjected to boronizing temperature of about 1650° F in a carburizing atmosphere for a period of about 5 hours. The pack and object are removed and allowed to cool. In going up to the boronizing temperature, the anhydrous binding agent will burn off to form a boronizing resist in the form of the mineral coating of titanium dioxide and graphite. The mineral coating of titanium dioxide and graphite protects the selected areas against boronizing. Once removed and allowed to cool the mineral coating of titanium dioxide and graphite is removed, as by being washed off by an aqueous solution.

While the use of the paint in applying the coating for forming the boronizing resist has been described hereinbefore, the coating may be applied by any of the conventional methods; such as, spraying, hot melt application, or the like.

While the pack method of boronizing has been described hereinbefore, any of the conventional methods of boronizing can be employed and the boronizing resist of this invention will resist the boronizing effects on the selected surfaces to which the coating has been applied.

In operation, any extra metallic oxides that are employed are added simultaneously with the admixing of the other solids with the solvent in order to finally form the smooth consistency of the paint.

The resulting final composition is applied similarly as described hereinbefore before the boronizing step is carried out. The final mineral coating left after the anhydrous binding agent is burned off is then removed, similarly as described hereinbefore.

The following examples illustrate the best embodiments of this invention that have been found to date.

EXAMPLE I

In this example, the preferred embodiment is delineated. Into a large mixing vessel, 15 gallons of xylene was added. Forty pounds of the resin was then admixed therewith. The preferred resin; namely, a vinyl-toluene modified alkyd resin; was employed. It is commercially available as Styresol 13-038. The resin was mixed thoroughly. While mixing, 180 pounds of powdered titanium dioxide was added slowly. While mixing, 180 pounds of flaked graphite was added very slowly. The total admixture was thoroughly admixed to a smooth and uniform consistency with no lumps or dry material present in the mixing vessel. A 400 milliliter sample was then taken and tested for the predetermined desired viscosity and specific gravity.

Aliquot portions were then sealed tightly into respective containers, such as one quart paint cans.

The paint was then employed to paint the predetermined surfaces that were not to be boronized. The object was thereafter subjected to boronizing conditions, or had its unprotected ferrous surfaces boronized as described in U.S. Pat. No. 3,922,038, cited hereinbelow.

The boronizing pack and object were cooled. The boronizing pack was removed. The unprotected surface were boronized. The mineral coating formed by the burning away of the anhydrous binding agent was removed. The selected surface that had been painted and protected was found to have substantially no boron penetration; for example, 0.0005 inch or less. This compares with a blank that had a penetration of up to 0.0035 inch.

EXAMPLE II

In this example, 10 percent by weight of the vinyl toluene alkyd resin of Example I, 23 percent by weight of the finely divided titanium dioxide and 67 percent by weight of the flaked graphite were employed with 33 milliliters xylene per 100 grams of solid in forming the paint for protecting against boronizing. Thereafter, two objects were subjected to boronizing conditions, one blank and the other having surfaces painted with the delineated paint. The unpainted object had a boronized penetration, referred to as boronizing case depth, of up to 5.0 mils. With a single coat of paint, the boronized case depth was only in the range of 0.1–0.15 mil. With two coats of paint, the boronized case depth penetration was in the range of 0.0–0.5 mil.

EXAMPLE III

In this example, as in Example II, the same ingredients were employed as were employed in Example I. Only the concentrations were varied. In this example the ingredients in the paint other than solvent had 20 percent of the resin, 20 percent of the titanium dioxide and 60 percent of the graphite, the percents being by weight. Thirty milliliters of xylene were employed per 100 grams of the other ingredients. The paint was admixed as described hereinbefore and applied. With a single coat of paint, the boronized case depth was 0.5 – 1.0 mils, compared with 3.5 – 5.0 mils with a blank. When two coats of the paint were employed the boronized case depth was only 0.15 mils and even that was spotted with regions of substantially complete protection.

EXAMPLE IV

In this example, the same ingredients were employed as described hereinbefore with respect to Example I, but the percentages were vaired. The ingredients in the paint other than solvent had 20 percent by weight of the resin, 40 percent by weight of the titanium dioxide and 40 percent by weight of the graphite. Only 25 milliliters of xylene were employed per 100 grams of the other ingredients. With a single coat, this paint gave a protection of such that boronized case depth was only 0.5 – 1.0 mils as compared to the 3.5 – 5.0 mils with the blank.

EXAMPLE V

In this example the same ingredients were employed as described hereinbefore. Again, different concentrations were employed. The ingredients in the paint other than solvent in this example had 10 percent by weight of the resin, 45 percent by weight of the titanium dioxide and 45 percent by weight of the graphite. Thirty milliliters of xylene were employed per 100 grams of the other ingredients. With a single coat, this paint afforded a protection such that after boronizing, the boronized case depth was only 0.5 – 1.0 mils as contrasted to the 3.5 – 5.0 mils on the blank. When two coats of the paint were employed the boronized case depth was only spotty with the maximum depth being 0.5 mil.

Other paints were tried, employing ingredients other than solvent including from 22.5 to 67.5 percent by weight of the titanium dioxide, 22.5 to 67.5 percent of the graphite and 10–20 percent of the resin. All gave a boronizing resist, although when more than about 50 percent by weight of the titanium dioxide and below about 20 percent by weight of the graphite were employed, the results were inconsistent and erratic.

From the foregoing it can be seen that this invention allows selectively boronizing by composition and method that employs a composition that forms a boronizing resist on the selected areas to which the coating is applied. This invention thus satisfies a major impediment to selective boronizing in accordance with prior art methods, since the prior art methods did not afford or employ a composition, or coating, that could be applied to selected areas to protect against boronizing.

Having thus described the invention, it will be understood that such description has been given by way of illustration and example and not by way of limitation, reference for the latter purpose being had to the appended claims.

What is claimed is:

1. A paint adapted for resisting boronizing a predetermined surface area on which it is painted and forming a part of a larger surface area at least a portion of which is to boronized, comprising:
   a. a concentration within the range of 10–50 percent by weight of finely divided titanium dioxide;
   b. a concentration within the range of 20–70 percent by weight of finely divided carbonaceous material;
   c. a concentration within the range of 5–20 percent by weight of organic resin that will burn away at a temperature greater than 1400° F; and
   d. sufficient solvent to dissolve said resin and effect a predetermined viscosity; said viscosity being low enough to allow painting onto the predetermined surface area and being high enough to form a coating that will form a boronizing resist at said temperature greater than 1400° F;

such that when said paint is applied to the predetermined surface area that is not to be boronized and that forms a part of the larger surface, at least a portion of which is to be boronized, said paint forms at said temperature a readily removable boronizing resist that protects the predetermined surface area against said boronizing and facilitates removal of said boronizing resist.

2. The paint of claim 1 wherein said paint includes a concentration within the range of 1–45 percent by weight of a material selected from the class consisting of tin oxide and copper oxide.

3. The paint of claim 1 wherein said finely divided titanium dioxide is powder and is present in a concentration of about 45 percent by weight; said finely divided carbonaceous material is powdered flake graphite and is present in a concentration of about 45 percent by weight; and said resin is present in a concentration of about 10 percent by weight; said concentrations in percents being based on the weight of the titanium dioxide, graphite and resin initially employed.

4. The paint of claim 1 wherein said resin comprises vinyl-toluene modified alkyd resin and said viscosity is within the range which gives a time interval of flow on a standard paint viscosimeter of 18–31 seconds for the first 25 milliliters and 40–100 seconds for the first 50 milliliters.

5. The paint of claim 1 wherein said paint comprises 10–30 percent by weight of said solvent and 70–90 percent by weight of the remaining ingredients other than solvent, said remaining ingredients being proportioned about 45 percent by weight of said titanium dioxide, about 45 percent by weight of said carbonaceous material and about 10 percent by weight of said resin.

6. The paint of claim 1 wherein a concentration of 21.3 percent by weight of solvent is employed and said remaining ingredient comprise about 78.7 percent by weight.

7. A paint adapted for resisting boronizing a predetermined surface area on which it is painted and forming a part of a larger surface area at least a portion of which is to be boronized, comprising a concentration within the range of 10–50 percent by weight of finely divided titanium dioxide; a concentration within the range of 20–70 percent by weight of finely divided carbonaceous material; and a concentration within the range of 10–40 percent of an anhydrous binding agent that will provide sufficient fluidity to obtain a predetermined viscosity and that will burn away at a temperature greater than 1400° F to leave a boronizing resist on the predetermined surface area that is to be protected against boronizing at boronizing temperatures; said predetermined viscosity being low enough to allow painting onto the predetermined surface area and being high enough to form a coating that will form a boronizing resist at said temperature greater than 1400° F; such that when said paint is applied to the predetermined surface area that is not to be boronized, and said paint is subjected to said temperature in excess of 1400° F, it forms said boronizing resist that protects the predetermined surface area against said boronizing; said paint forming a boronizing resist that is readily removable.

8. The paint of claim 7 wherein said paint comprises about 29.2 percent by weight of anhydrous binding agent, about 35.4 percent by weight of titanium dioxide, and about 35.4 percent by weight of carbonaceous material.

9. The paint of claim 7 wherein said carbonaceous material comprises powdered flake graphite.

10. The paint of claim 7 wherein said paint includes the following approximate respective concentrations in percent by weight of respective components: 35.4 — said titanium dioxide; 35.4 — powdered flake graphite; and 29.2 — said anhydrous binding agent formed by 7.8 — of an organic resin that will burn away at a temperature greater than 1400° F and 21.4 — of a solvent that will dissolve said organic resin and form a paint having a viscosity within the range which gives a time interval of flow on a standard paint viscosimeter of 18 – 31 seconds for the first 25 milliliters and 49 – 100 seconds for the first 50 milliliters.

11. A method of selectively boronizing the surfaces of a ferrous metal that comprises applying to such area as is not to be boronized a coating consisting essentially of finely divided titanium dioxide, finely divided carbonaceous material and an anhydrous binding agent that will burn away at a temperature greater than 1400° F; said titanium dioxide, said carbonaceous material and said anhydrous binding agent being in effective amounts to form a boronizing resist having a boronizing resistance during boronizing and forming a readily removable boronizing resist following heating to said temperature in excess of 1400° F; then heating said area and said coating to at least said temperature above 1400° F and boronizing said ferrous metal at a temperature at least as great as said temperature at which said coating forms said boronizing resist and subsequently removing said readily removable boronizing resist.

12. The method of claim 11 wherein said coating is applied in a paint form said paint comprising:
   a. a concentration within the range of 10–50 percent by weight of said finely divided titanium dioxide;
   b. a concentration within the range of 20–70 percent by weight of said finely divided carbonaceous material;
   c. a concentration within the range of 5–20 percent by weight of an organic resin that will burn away at temperatures above 1400° F; and
   d. sufficient solvent to dissolve said resin and effect a predetermined viscosity; said viscosity being low enough to allow painting onto the area that is not to be boronized and being high enough to form a coating that will form a boronizing resist at said temperature greater than 1400° F;

such that said paint is applied to a said area that is not to be boronized and protects said area against boronizing at boronizing temperatures and forms said boronizing resist that is readily removable to facilitate the step of removing said boronizing resist.

13. The method of claim 12 wherein said paint includes a concentration within the range of 1–45 percent by weight of a material selected from the class consisting of tin oxide and copper oxide.

14. The method of claim 12 wherein said paint includes the ingredients other than said solvent proportioned in a weight ratio of about 45 percent by weight of said finely divided titanium dioxide, about 45 percent by weight of said finely divided carbonaceous material and about 10 percent by weight of said resin.

15. The method of claim 12 wherein said paint comprises 10–30 percent by weight of said solvent and 70–90 percent by weight of said remaining ingredients other than solvent, said remaining ingredients being proportioned about 45 percent by weight of said titanium dioxide, about 45 percent by weight of said carbonaceous material and about 10 percent by weight of said resin.

16. The method of claim 15 wherein a concentration of 21.3 percent by weight of solvent is employed and said other ingredients comprise about 78.7 percent by weight.

17. The method of claim 12 wherein said paint includes ingredients, other than said solvent, that are proportioned in a weight ratio of about 45 percent by weight of said finely divided titanium dioxide, about 45 percent by weight of said finely divided carbonaceous material and about 10 percent by weight of said resin.

* * * * *